(12) United States Patent
Daniel et al.

(10) Patent No.: US 6,436,460 B1
(45) Date of Patent: *Aug. 20, 2002

(54) ICE CONFECTION

(75) Inventors: Adrian Daniel; Ian Lacy; Jon Richard Oldroyd, all of Bedford (GB)

(73) Assignee: Good Humor-Breyers Ice Cream, Division of Conopco, Inc., Green Bay, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/521,582

(22) Filed: Mar. 9, 2000

(30) Foreign Application Priority Data

Mar. 10, 1999 (GB) .............................................. 9905524
Jul. 23, 1999 (EP) .............................................. 99305842

(51) Int. Cl.[7] .................................................. A23G 9/02
(52) U.S. Cl. ...................... 426/565; 426/101; 426/660; 426/656
(58) Field of Search ................................ 426/565, 660, 426/101, 656

(56) References Cited

U.S. PATENT DOCUMENTS

| | | | |
|---|---|---|---|
| 2,909,433 A | * | 10/1959 | Morrison |
| 3,460,713 A | * | 8/1969 | Cornelius |
| 3,642,174 A | * | 2/1972 | Cornelius |
| 3,969,531 A | | 7/1976 | Cornelius |
| 4,738,862 A | * | 4/1988 | Bee |
| 4,826,656 A | | 5/1989 | Huber et al. |
| 5,620,732 A | | 4/1997 | Clemmings et al. |
| 6,093,438 A | * | 7/2000 | Vaghela et al. |
| 6,120,813 A | * | 9/2000 | Barnes et al. |

FOREIGN PATENT DOCUMENTS

| | | |
|---|---|---|
| DE | 197 32 132 A1 | 1/1998 |
| DE | 197 32 135 A1 | 2/1998 |
| EP | 0 843 010 A1 | 5/1998 |
| GB | 915389 * | 1/1963 |
| GB | 1050213 | 12/1966 |
| GB | 1313807 * | 4/1973 |
| GB | 2 315 662 A | 2/1998 |
| GB | 2315752 | 2/1998 |
| GB | 2 315 753 A | 2/1998 |
| GB | 2 328 136 A | 2/1999 |
| JP | 80013708 | 4/1980 |
| WO | 92/22581 | 12/1992 |
| WO | 97/02343 | 1/1997 |
| WO | WO 98/04146 * | 2/1998 |
| WO | 98/04147 | 2/1998 |
| WO | 98/04148 | 2/1998 |
| WO | 98/22591 | 5/1998 |
| WO | 98/41106 | 9/1998 |
| WO | 98/41109 | 9/1998 |
| WO | 98/04699 | 2/1999 |
| WO | 99/38386 | 8/1999 |
| WO | WO 00/53027 * | 9/2000 |

OTHER PUBLICATIONS

"Antifreeze Proteins And Their Potential Use In Frozen", Marilyn Griffith and K. Vanya Ewart, Biotechnology Advances, vol. 13, No. 3, pp. 375–402, 1995.

"Low Temperature Sugar–Water Equillibrium Curve By A Rapid Calorimetric Method", B. de Cindio, S. Correra & V. Hoff, Journal of Food Engineering, vol. 24 (1995), pp. 405–415.

* cited by examiner

*Primary Examiner*—Nina Bhat
(74) *Attorney, Agent, or Firm*—Gerard J. McGowan, Jr.

(57) ABSTRACT

A water ice comprising an antifreeze protein, a stabilizer and not less than 0.1 wt % of a protein based aerating agent obtainable by a process comprising aerating the ice confection with an aerating gas which contains at least 50% by volume of a water soluble gas such as carbon dioxide, nitrous oxide and mixtures thereof.

9 Claims, 3 Drawing Sheets

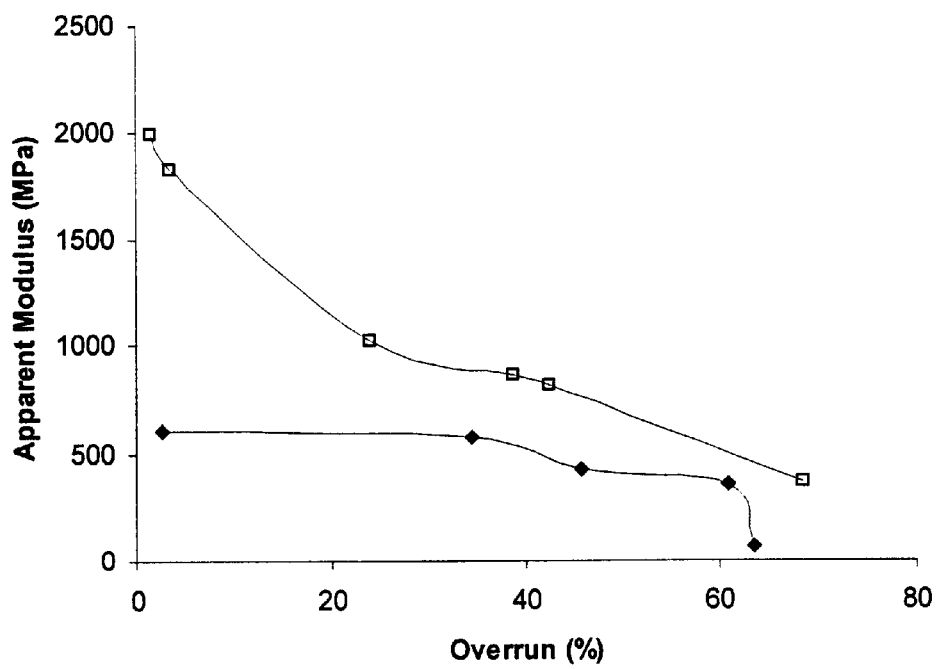
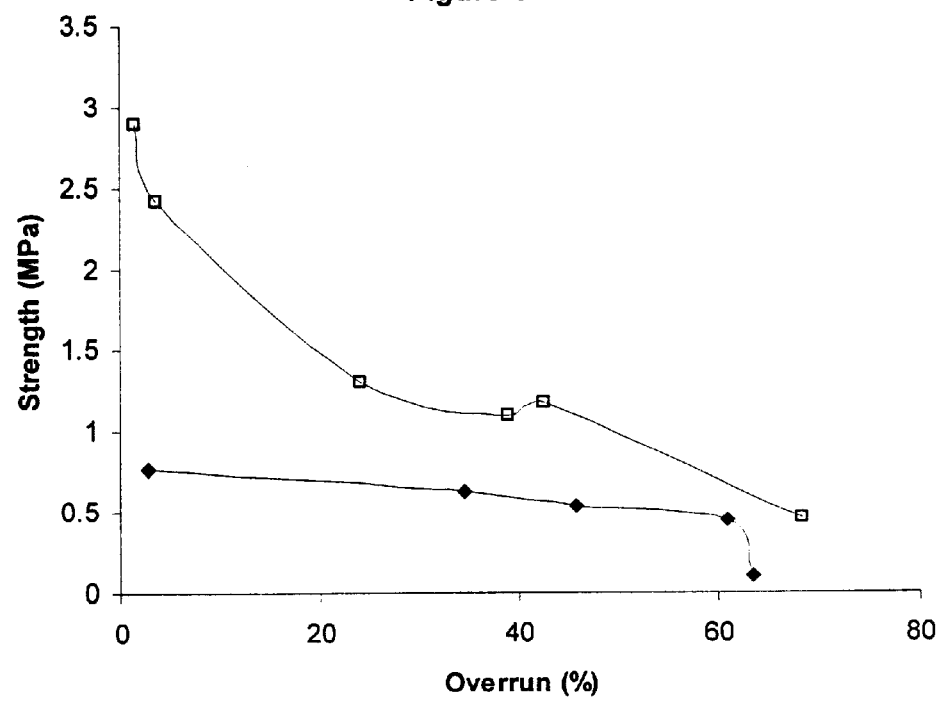

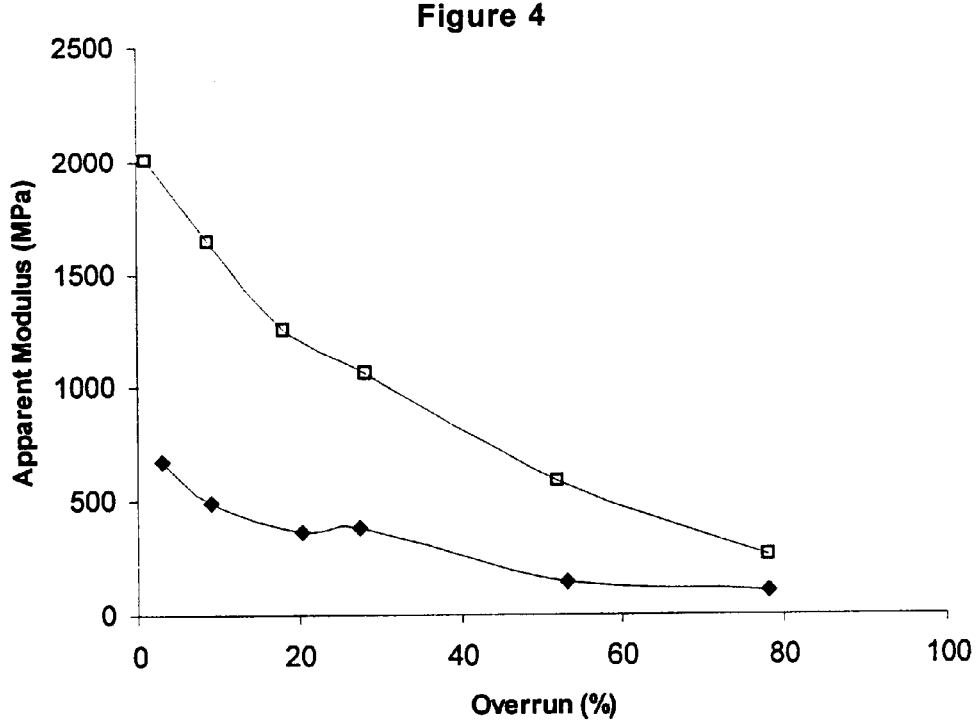
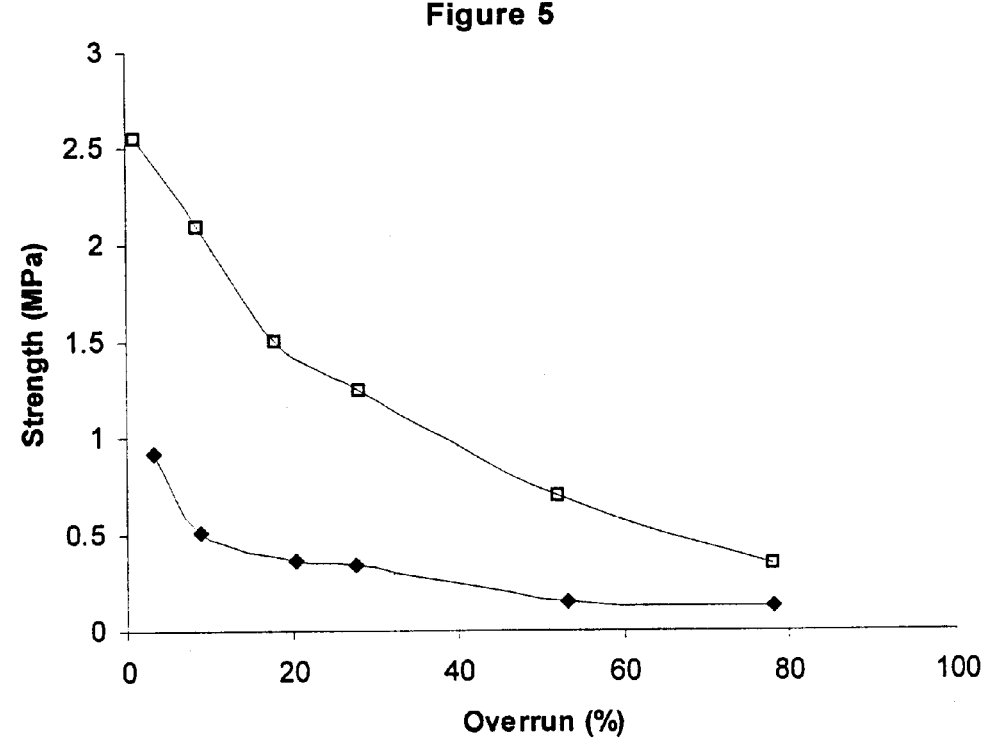

ICE CONFECTION

TECHNICAL FIELD OF THE INVENTION

The invention relates to novel water ices aerated with a water soluble gas. In particular the invention relates to novel water ices aerated with a water soluble gas which contain an antifreeze protein in their composition.

BACKGROUND TO THE INVENTION

It is highly desirable to be able to manufacture a water ice having novel shapes, properties and/or textures. Until now, however the ability to provide such a high degree of novelty and interest to the products has been limited. In particular products have to be manufactured with the ability to survive packaging, storage and distribution.

It is especially desirable to be able to provide a water ice that has a low calorific content. Such a water ice has the advantage of being particularly refreshing.

However, if a low calorie containing water ice is manufactured in the conventional way a very hard block of ice is achieved which is not acceptable to the consumer when eaten at typical freezer temperatures.

Products which have been aerated by soluble gases such as carbon dioxide and/or nitrous oxide have been disclosed in the literature. Examples are U.S. Pat. No. 3,969,531 and JP 80013708.

U.S. Pat. No. 3,969,531 (Cornelius) discloses a process whereby a water and orange juice mixture is aerated wish nitrous oxide gas to form a semi frozen comestible.

JP 80013708 discloses a granular frozen drink that may be drunk through a straw. A syrup is mixed with the water and carbon dioxide within a machine for manufacturing a frozen drink such that a carbon dioxide gas is located among the frozen material.

U.S. Pat. No. 4,826,656 describes a smooth textured soft frozen water ice with a solids content of 18–26 wt % and an overrun of between 25–70% using air, where the water ice contains from 0.05 to 0.5 wt % of a stabilising mixture.

GB 915 389 describes a fat-free ice cream containing dispersed air or gas so that it is easily cut or bitten when cold.

However we have found that such products have stability problems such that they cannot be further processed, for example they can be difficult to extrude, and also they are not storage stable at $-18°$ C.

In our co-pending application PCT/EP 99/0029 (published as WO 99/38386 on Aug. 5, 1999 after the priority date of the present application) a water ice product which is stable to processing and storage at $-18°$ C. is provided having a channelled porous structure. However it is disclosed in WO 99/38386 that stable water ice products aerated with water-soluble gases cannot be provided if the product has a gas phase volume of greater than 0.45 after hardening. We have surprisingly found that water ice products having an antifreeze protein in their composition may be aerated with water-soluble gases such that a much higher gas phase volume may be achieved.

Additionally the inclusion of an antifreeze protein in the water ice composition provides the ice confection with specific defined mechanical properties. Such water ices have novel textures and/or properties and products may be provided having complex, highly defined shapes. The novel features can be retained during packaging, storage and distribution.

DISCLOSURE OF THE INVENTION

Accordingly the invention provides a water ice comprising an antifreeze protein, a stabiliser and not less than 0.1 wt % of a protein based aerating agent obtainable by a process comprising aerating the water ice with an aerating gas which contains at least 50% by volume of a water soluble gas such as carbon dioxide, nitrous oxide and mixtures thereof.

Preferably the aerating gas contains at least about 50% by volume, more preferably at least about 70% by volume of a water soluble gas, most preferably 100% by volume.

By water ice is meant a frozen solution made essentially from sugar, water, fruit acid or other acidifying agent, colour, fruit or fruit flavouring.

The water ice will typically have an ice content of at least 30% by volume when measured at $-18°$ C., more preferably at least 40% by volume when measured at $-18°$ C., most preferably at least 50% by volume when measured at $-18°$ C.

The ice content may be determined following the techniques described in the article by B de Cindio and S Correra in the Journal of Food Engineering, Volume 24, pages 405–415, 1995. The enthalpy data required for this technique is obtained using adiabatic calorimetry (Holometrix Adiabatic Calorimeter). The ice contents as expressed herein are measured on an 80 g sample poured into the sample holder of the calorimeter and cooled to $-75°$ C. by placing the assembly in dry ice prior to placing in the calorimeter (precooled to between $-70°$ C. and $-80°$ C.). The enthalpy data obtained was analysed to give ice content as a function of the temperature following the method of Cindio and Carrera.

In general the water ice has a total soluble solids content of less than 40% by weight, preferably less than 25% by weight, most preferably less than 15% by weight. For low calorie water ices the soluble solids content may be as low as approximately 5% by weight.

Typically the total soluble solids of the composition used to make water ice product of the present invention is in the range 5 wt % to 30 wt %, preferably 6 wt % to 25 wt % for example 7 wt % to 20 wt %.

The total soluble solids content is measured at $4°$ C. and is the % by weight of the total composition that is dissolved at that temperature.

A further advantage of water ice products which have been aerated with a water-soluble gas is that they are surprisingly provided with a surface which is substantially free from stickiness. Usually a non-sticky surface is obtained.

The water ice, must include within its composition a stabiliser and not less than 0.1 wt % of a protein-based aerating agent. Preferably a stabiliser is included in an amount of at least 0.1 wt %. The maximum amount of stabiliser is about 1.0 wt %. Preferably the amount of stabiliser is in the range of from 0.1 to 1.0 wt %, more preferably 0.15 wt % to 0.7 wt %, for example 0.2 to 0.5 wt %. For a given formulation and/or processing conditions the exact amount of stabiliser required will depend on the type of stabiliser used. The amount of stabiliser refers to the total amount of stabiliser(s) in the product.

As used herein the term "stabiliser" refers to compounds conventionally referred to in the art as stabilisers. They improve the stability of the water ice composition before freezing and act as thickening agents. It is believed that they increase the viscosity of the liquid phase before and during freezing.

Any stabiliser may be used, however Locust Bean Gum (LBG) is the preferred stabiliser. Other stabilisers that may be used include Agar-Agar, Algin-sodium alginate, proplyene glycol alginate, Gum acacia, Guar seed gum, gum karaya, oat gum, gum tragacanth, carrageenan and salts thereof, furcellaran and salts thereof, psyllium seed husk and cellulose stabilisers. Mixtures of any of these stabilisers may be used.

The amount of protein based aerating agent in a product aerated with water soluble gas is not less than 0.1 wt %. The typical wt % range for the aerating agent in the composition is 0.1 wt % to 0.5 wt %, more preferably 0.15 wt % to 0.4 wt %, more preferably 0.15 wt to 0.25 wt %.

An aerating agent, as the term is used herein, refers to any component which because of its surface activity and/or the viscosity it imparts, aids the formation of smaller gas cells (than would otherwise be formed) and resists their coalescence or separation in the unfrozen matrix.

Any protein based aerated agent may be used, for example egg based aerating agents such as egg white, sodium caseinate, soya isolate, wheat gluten and whey protein. Preferably the aerating agent is a hydrolysed milk protein such as Hyfoama (Trademark from Quest) and hydrolysed soya protein such as D-100 (trademark from Gunter Industries). The aerating agent is to be understood not to include aerating gas as referred to below.

By antifreeze protein (AEP) is meant a protein which has significant ice recrystallisation inhibition properties as measured in accordance with Example 2. The AFP provides an ice particle size upon recrystallisation of less than 20 μm, more preferred from 5 to 15 μm.

Preferably the water ice comprises at least 0.0005% by weight antifreeze protein, more preferably 0.0025% by weight antifreeze protein. Typically the water ice will comprise from 0.0005% by weight to 0.005% by weight antifreeze protein.

For some applications it may be advantageous to include a mixture of two or more different AFPs into the water ice.

The AFP for use in products of the invention can be any AFP suitable for use in food products. Examples of suitable sources of AFP are for example given in the article "Antifreeze proteins and their potential use in frozen food products", Marylin Griffith and K. Vanya Ewart, Biotechnology Advances, vol 13, pp375–402, 1995 and in patent applications WO 98/04699, WO 98/04146, WO 98/04147, WO 98/04148 and WO 98/22591.

The AEPs can be obtained from their sources by any suitable process, for example the isolation processes as described in the above mentioned documents.

One possible source of AEP materials is fish. Examples of fish AFP materials are antifreeze glycoproteins (AFGP) (for example obtainable from Atlantic cod, Greenland cod and Tomcod), Type I AFP (for example obtainable from Winter flounder, Yellowtail flounder, Shorthorn sculpin and Grubby sculpin), Type II AFP (for example obtainable from Sea raven, Smelt and Atlantic herring) and Type III AFP (for example obtainable from Ocean Pout, Atlantic wolffish, Radiated shanny, Rock gunnel and Laval's eelpout). A preferred example of the latter type is described in WO 97/02343.

Another possible source of AFP material are invertebrates. Also AFPs may be obtained from Bacteria.

A third possible source of AFP material are plants. Examples of plants containing AFPs are garlic-mustard, blue wood aster, spring oat, winter cress, winter canola, Brussels sprout, carrot, Dutchman's breeches, spurge, daylily, winter barley, Virginia waterleaf, narrow-leaved plantain, plantain, speargrass, Kentucky bluegrass, Eastern cottonwood, white oak, winter rye, bittersweet nightshade, potato, chickweed, dandelion, spring and winter wheat, triticale, periwinkle, violet and grass.

Both natural occurring species may be used or species which have been obtained through genetic modification. For example micro-organisms or plants may be genetically modified to express AFPs and the AFPs may then be used in accordance to the present invention.

Genetic manipulation techniques may be used to produce AFPs. Genetic manipulation techniques may be used to produce AFPs having at least 80%, more preferred more than 95%, most preferred 100% homology to the APPs directly obtained from the natural sources. For the purpose of the invention these AFPs possessing this high level of homology are also embraced within the term "AFPs".

The genetic manipulation techniques may be used as follows: An appropriate host cell or organism would be transformed by a gene construct that contains the desired polypeptide. The nucleotide sequence coding for the polypeptide can be inserted into a suitable expression vector encoding the necessary elements for transcription and translation and in such a manner that they will be expressed under appropriate conditions (for example in proper orientation and correct reading frame and with appropriate targeting and expression sequences). The methods required to construct these expression vectors are well known to those skilled in the art.

A number of expression systems may be utilised to express the polypeptide coding sequence. These include, but are not limited to, bacteria, yeast insect cell systems, plant cell culture systems and plants all transformed with the appropriate expression vectors.

A wide variety of plants and plant cell systems can be transformed with the nucleic acid constructs of the desired polypeptides. Preferred embodiments would include, but are not limited to, maize, tomato, tobacco, carrots, strawberries, rape seed and sugar beet.

For some natural sources the AFPs may consist of a mixture of two or more different AFPs.

Preferably the antifreeze protein is chosen such that it gives an aspect ratio of more than 1.9 to the ice crystal, preferably from 1.9 to 3.0, more preferably from 2.0 to 2.9, even more preferred from 2.1 and 2.8 (see WO 98/04146). Aspect ratio is defined as the maximum diameter of a particle divided by its minimum diameter. The aspect ratio can be determined by any suitable method. A preferred method is illustrated in the Examples (Example 3).

For the purpose of the invention the preferred AFPs are derived from fish. Especially preferred is the use of fish proteins of the type III, most preferred HPLC 12 as described in our case WO 97/02343.

Surprisingly aerated water ice compositions containing antifreeze proteins have similar mechanical properties if they are aerated with air or with a water soluble gas.

Accordingly water ice compositions containing antifreeze proteins which have been aerated with a water soluble gas have the following mechanical properties;

$\Delta$ modulus/original modulus$\geq$0.4, and/or $\Delta$ strength/original strength$\geq$0.7, providing that when $\Delta$ modulus/original modulus$\leq$6.0, $\Delta$ modulus$\geq$90 MPa, and/or when $\Delta$ strength/original strength$\leq$2.0, $\Delta$ strength$\geq$0.2 MPa.

Most preferably $\Delta$ modulus/original modulus$\geq$1.0; providing that when $\Delta$ modulus/original modulus$\leq$6.0, $\Delta$ modulus$\geq$100 MPa.

Preferably $\Delta$ strength/original strength$\geq$0.9. Most preferably $\Delta$ strength/original strength$\geq$1.5.

By modulus is meant the apparent elastic modulus (E) as determined using a four point bend test. Example 1 gives the standard procedure for performing a four point bend test.

Therefore $\Delta$ modulus ($\Delta$E) means the change in modulus between two water ices whose formulation and process of manufacture are identical in all respects except that the first water ice includes in its composition an antifreeze protein, and the second water ice has no antifreeze protein included in its composition (the control composition). Original modulus ($E_{orig}$) is the modulus measured in the control composition.

By strength is meant the flexure strength ($\sigma_u$) which can be defined as the maximum stress that a material can withstand, under the particular conditions. The flexure strength is given by the stress at a point of maximum force on the force versus displacement curve recorded during a four point bend test.

Therefore $\Delta$ strength ($\Delta\sigma_u$) means the change in strength between two water ices whose formulation and process of manufacture are identical in all respects except that the first water ice includes in its composition an antifreeze protein, and the second water ice has no antifreeze protein included in its composition (the control composition).

Original strength ($\sigma_{u\ orig}$) is the modulus measured in the control composition.

Products according to the invention have a channelled porous structure.

By channelled porous structure is meant a structure containing voids in the form of tortuous, non-spherical channels. The channels being formed by the gas phase. These structures can be distinguished from known aerated structures where the gas phase forms voids in the form of bubbles, the majority of which are substantially spherical in shape for a gas phase volume of between 0.1 and 0.45.

The structures of products according to the invention can be distinguished from AFP containing structures aerated with a non-soluble gas such as air by the relative diameter of the individual gas channels present in products aerated with a soluble gas being greater for the same overrun than the voids present in products aerated with a non-soluble gas.

Furthermore, the structures can be distinguished from non-AFP containing structures aerated with a soluble gas. In products according to the invention the non-gaseous phase comprises a close-packed continuous network of ice crystals.

By close-packed continuous network of ice crystals is meant that any given ice crystal is connected to at least one other ice crystal.

As mentioned above, the addition of an antifreeze protein into the water ice composition provides the water ice product which has been aerated with a water soluble gas with novel textures and properties.

The water ice containing the antifreeze protein may constitute the entire product or may be a component of a composite product. For a composite product the water ice of the invention is included within a conventional ice confection to provide texture contrast. Preferably such composite products contain the water ice in accordance with the invention as discrete elements in their structure. For example, a relatively soft ice cream core can be coated with a layer of the composition of the invention to provide a hard, crispy layer surrounding the ice cream core. Another example would be the incorporation of the water ice of the invention as inclusions in ice confections. Alternatively the product may be provided with a continuous or partial coating of, for example, a water glaze or a non-aerated water ice on at least one surface.

Water ice products according to the invention, which are aerated with a water-soluble gas, may conveniently be prepared by a method comprising the following process steps;
(i) aeration of a water ice composition with an aerating gas which contains at least about 50% by volume, preferably at least about 70% by volume, most preferably 100% by volume, of a water soluble gas.
(ii) freezing in a freezer, for example, an ice cream freezer, such that the residence time in the freezer is approximately 2.5 to 10 minutes, preferably 3 to 9 minutes, for example 3 to 8 minutes; and
(iii) two-stage hardening.

A water-soluble aerating gas is one with a solubility in water of at least 2 grams/100 g of water at 4° C. and 760 mmHg.

The water-soluble gas may typically be carbon dioxide, nitrous oxide and mixtures thereof. The remainder of the aerating gas will typically be nitrogen containing gas e.g. air.

Preferably the aerating gas is carbon dioxide or a mixture of gases containing carbon dioxide.

Aeration may occur within the (ice cream) freezer or alternatively before freezing, e.g., within a pre-aerator before the water ice composition enters the (ice cream) freezer.

Typically the ice cream freezer will be a scraped surface heat exchanger.

It is to be understood that the aerating gas used according to the invention is not to be essentially air, but must comprise a water soluble gas as defined above.

It is particularly preferred that the two stage hardening step mentioned in the process above is conducted as follows:

The two stage hardening step may be achieved by rapid freezing in the first stage to partially form the structure of the ice product, with the temperature of the second stage being suitable for expansion of the structure. The first stage hardening is preferably carried out using a colder temperature than the second stage. The first stage may use air at −20° C. or below blown over the product. The hardening step could occur in a single freezer or in a first colder freezer with the second stage occurring in another freezer during storage.

A preferred two stage hardening step is;
(1) The temperature of the product needs to be reduced to below at least −20° C. within approximately 2 hours, for example within, a blast freezer, hardening tunnel, liquid nitrogen or any other suitable rapid cooling means. Typically the product is placed in a blast freezer for 1 hour at −35° C.; and
(2) The product is then retained at a temperature of approximately −18° C. or below until the product density stabilises. This may be effected by storing the product for 3 days in a cold store at −24° C. The structure is stabilised when there is no further change in its density.

DESCRIPTION OF THE DRAWINGS

In FIGS. 2 to 5, AFP containing examples are shown by (□), control samples containing no AFP are shown by (♦)

FIG. 2 shows a comparison of the apparent modulus measured for Examples 4–9 compared with Comparative Examples A–E.

FIG. 3 shows a comparison of the flexure strength measured for Examples 4–9 compared with Comparative Examples A–E.

FIG. 4 shows a comparison of the apparent modulus measured for Comparative Examples F–K compared with relevant control samples.

FIG. 5 shows a comparison of the flexure strength measured for Comparative Examples F–K compared with relevant control samples.

EXAMPLES

Figure 1:
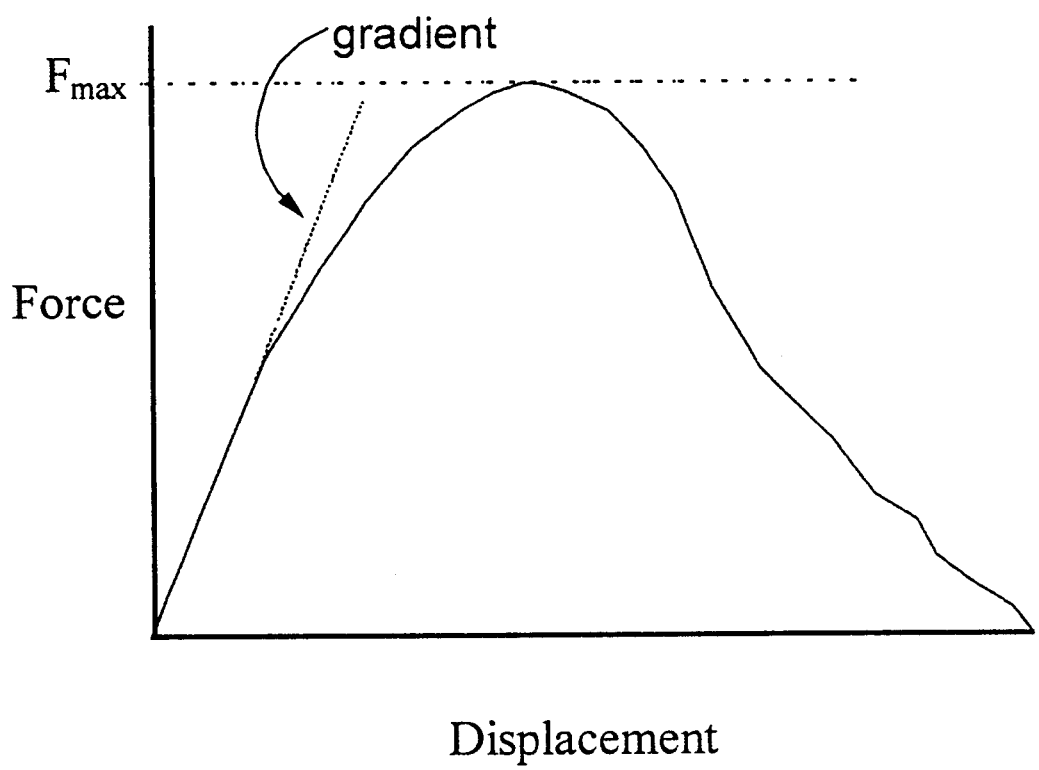
FIG. 1 shows a schematic of the data recorded during a four-point bend test.

The invention will now be illustrated by means of the following examples.

Example 1

Four Point Bend Test

The standard four point bend test can be used to determine a number of mechanical properties of ice confection materials. The mechanical properties being measured are Young's modulus (apparent) and flexure strength.

In a bend test, a test piece is deformed whilst measuring the applied force and test piece deflection. A schematic data set for an ice confection is shown in FIG. 1. The apparent elastic modulus is determined by the gradient of the initial linear part of this curve.

The 4-point bend test requires production of a parallel sided rectangular bar of ice confection material. This may be obtained by any suitable means.

In this particular application the parallel sided rectangular bar of ice confection was made using aluminium moulds producing bars having the dimensions 25×25×200 mm.

a) Quiescent Frozen Ice Confections

The liquid ice confection pre-mix was poured into a mould which had been pre-cooled in a blast freezer at −35° C. for at least 30 minutes, the mould was then placed in a blast freezer at −35° C. for at least 2 hours. The samples were then de-moulded and stored at −25° C. until testing (conducted after 5–6 days). 18 to 24 hours prior to testing the samples were equilibrated by storing at −18° C., the temperature at which all tests were performed. A minimum of 10 bars was tested for each sample set and the mean value of each sample set was recorded as the value of the mechanical property being measured.

b) Ice Confections Frozen with Agitation

The ice confection was extruded from the ice cream freezer (scraped surface heat exchanger) at a temperature of from −1° C. to −5° C., depending on the ice confection, into a mould which had been pre-cooled in a blast freezer at −35° C. for at least 30 minutes, the mould was lined with silicon paper to prevent ice-metal adhesion. The sample was then prepared as above for quiescent frozen samples.

The general test applied to all types of solids is described in "Biomechanics Materials. A practical Approach" Ed. J. F. V. Vincent, Pub. IRL Press, Oxford University Press, Walton Street, Oxford, 1992 and "Handbook of Plastics Test materials" Ed. R. P. Brown, Pub. George Godwin Limited, The Builder Group, 1–3 Pemberton Row, Fleet Street, London, 1981. Testing involves placing each bar onto 2 supports and bending it until fracture by applying pressure from two upper supports, that are separated by 85 mm, centrally on the bar's top surface. The force applied in bending and the displacement of the moving contact are recorded throughout the test. The speed of descent of the moving support was 50 mm per minute.

The apparent elastic modulus of the material is given by the equation;

$$E = \frac{(0.21) \cdot gradient \cdot S^3}{BD^3}$$

where the gradient is that shown in FIG. 1, S is the span (distance) between the supporting contacts beneath the test bar, B is the width of the bar and D is the depth of the bar. For these tests the span (S) was 170 mm.

With reference to FIG. 1, the strength of a material under three point bend conditions, is given as;

$$\sigma_u = \frac{(0.75) \cdot F_{max} S}{BD^2}$$

where $\sigma_u$ is the flexure strength and $F_{max}$ is the maximum force recorded.

Example 2

Method of determining whether an AFP possesses ice recryszallisation inhibition properties.

Recryszallisation inhibition properties can measured using a modified "splat assay" (Knight et al, 1988). 2.5 μl of the solution under investigation in 30% (w/w) sucrose is transferred onto a clean, appropriately labelled, 16 mm circular coverslip. A second coverslip is placed on top of the drop of solution and the sandwich pressed together between finger and thumb. The sandwich is dropped into a bath of hexane held at −80° C. in a box of dry ice. When all sandwiches have been prepared, sandwiches are transferred from the −80° C. hexane bath to the viewing chamber containing hexane held at −6° C. using forceps pre-cooled in the dry ice. Upon transfer to −6° C., sandwiches can be seen to change from a transparent to an opaque appearance. Images are recorded by video camera and grabbed into an image analysis system (LUCIA, Nikon) using a 20× objective. Images of each splat are recorded at time=0 and again after 60 minutes. The size of the ice-crystals in both assays is compared by placing the slides within a temperature controlled cryostat cabinet (Bright Instrument Co Ltd, Huntington, UK). Images of the samples are transferred to a Quantimet 520 MC image analysis system (Leica, Cambridge UK) by means of a Sony monochrome CCD videocamera. Ice crystal sizing was performed by hand-drawing around ice-crystal. At least 400 crystals were sized for each sample. The ice crystal size was taken as being the longest dimension of the 2D projection of each crystal. The average crystal size was determined as the number average of the individual crystal sizes. If the size at 30–60 minutes is similar or only moderately (less than 10%) increased compared to the size at t=0, and/or the crystal size is less than 20 micrometer, preferably from 5 to 15 micrometer this is an indication of good ice recrystallisation inhibition properties Example 3

Aspect Ratio Measurement

Samples were equilibrated at −18° C. in a Prolan environmental cabinet for approximately 12 hours. Microscopic slides were prepared by smearing a thin layer of ice confection from the centre of thin glass plates.

Each slide was transferred to a temperature controlled microscopic stage (at −18° C.) where images of ice crystals (about 400 individual ice crystals) were collected and relayed through a video camera to an image storage and analysis system.

The stored ice crystal images were highlighted manually by drawing around its perimeter which then highlights the whole crystal. Images of the highlighted crystals were then measured using the image analysis software which counts the number of pixels required to complete the longest diameter (length), shortest diameter (breadth), the aspect ratio (length/breadth).

The average aspect ratio for the crystals was calculated.

Examples 4–9, Comparative Examples A–E.

A water ice solution having the following composition was prepared as follows;

|  | % by Weight |
| --- | --- |
| Sucrose | 10 |
| Locust Bean Gum | 0.25 |
| Hydrolysed milk protein (Hyfoama DS**) | 0.1 |
| Type III AFP* | 0.0025 |
| Water | to 100 |

*as described in WO 97/02343
**Hyfoama DS is a trademark of Quest International

All the water ice ingredients except the AFP were mixed together in a high shear mixer for approximately 3 minutes, the water being added at a temperature of 90° C. The temperature of the water ice was approximately 55 to 60° C. after mixing. The AFP was added to the mixer approximately 30 seconds prior to the end of the mixing time.

The mixture was pasteurised in a plate heat exchanger at 81° C. for 25 seconds and then cooled in the plate heat exchanger to 5° C. prior to use.

The water ice solution was simultaneously frozen and aerated in a Technohoy MF 75 scraped surface heat exchanger with open dasher at the rate of 0.5 liters per minute. The aerating agent was 100% carbon dioxide. Water ice was provided having the following different overruns (volume fraction of carbon dioxide) achieved by altering the flow rate of the aerating agent as appropriate. The residence time in the freezer was 3 minutes. The water ice was extruded at a temperature of from −1.0 to −3.0° C. The product was then hardened in a blast freezer at −35° C. for at least 1 hour before transferring to a cold store at −25° C. for 3 days.

Example 4—No Overrun (0)

Example 5—4% Overrun (0.03)

Example 6—24% Overrun (0.19)

Example 7—39% Overrun (0.28)

Example 8—42% Overrun (0.3)

Example 9—68% Overrun (0.41)

The overrun is the achieved overrun after storage for 4 days. The figure in brackets is the volume fraction Of $CO_2$.

Further, Comparative Examples having no AFP were prepared as follows;

Comparative Example A—0% Overrun (0)

Comparative Example B—34% Overrun (0.26)

Comparative Example C—46% Overrun (0.31)

Comparative Example D—61% Overrun (0.38)

Comparative Example E—63% Overrun (0.39)

The overrun is the achieved overrun after storage for 4 days. The figure in brackets is the volume fraction of $CO_2$.

The apparent elastic modulus and the flexure strength were determined using a four point bend test as described in Example 1.

Results are shown in FIGS. 2 & 3, where AFP containing examples are shown by (□) and the comparative examples containing no AEP are shown by (♦).

Comparative Examples F–K.

Examples 4–9 were repeated except that the aerating agent was air.

Comparative Example F—No Overrun (0)

Comparative Example G—20% Overrun (0.167)

Comparative Example H—30% Overrun (0.23)

Comparative Example I—43% Overrun (0.3)

Comparative Example J—67% overrun (0.4)

Comparative Example K—100% Overrun (0.5)

The apparent elastic modulus and the flexure strength were determined using a four point bend test as described in Example 1.

Results were compared with a control sample containing no AFP. Results are shown in FIGS. 4 & 5, where AEP examples are shown by (□) and control samples containing no AEP are shown by(♦). Δ modulus, Δ modulus/original modulus, Δ strength and Δ strength/original strength were calculated. Results are shown in Table 1.

TABLE 1

| Example | ΔE (MPa) | ΔE/$E_{orig}$ | $\Delta\sigma_u$ (MPa) | $\Delta\sigma_u$/$\sigma_{u\ orig}$ |
|---------|----------|---------------|------------------------|-------------------------------------|
| F | 1338.8 | 2.0 | 1.63 | 1.78 |
| G | 1147.5 | 2.3 | 1.57 | 3.08 |
| H | 885.6 | 2.4 | 1.13 | 3.14 |
| I | 679.4 | 1.8 | 0.90 | 2.65 |
| J | 439.9 | 3.0 | 0.55 | 3.67 |
| K | 161.9 | 1.6 | 0.22 | 1.83 |

Example 10

Preparation of a water ice product aerated with carbon dioxide, with novel eating properties.

A water ice solution having the following composition was prepared as follows;

| | % (w/w) |
|---|---------|
| Sucrose | 10.0 |
| Glucose | 5.0 |
| Locust Bean Gum | 0.2 |
| Toffee Flavour/Colour | 0.5 |
| AFP * | 0.005 |
| Water | to 100 |

* as described in WO 97/02343

All the water ice ingredients except AFP were mixed together using a high shear mixer for approximately 3 minutes. The water being added at a temperature of 80° C. The temperature of the water ice mix was approximately 55–65° C. after mixing.

The mix was then homogenized (2000 psi) and passed through to a plate heat exchanger for pasteurization at 81° C. for 25 seconds. The mix was then cooled to approximately 40° C. in the plate heat exchanger prior to use.

The water ice mix was then simultaneously frozen and aerated using a Technohoy MF 75 scraped surface heat exchanger. The aerating agent was 100% carbon dioxide. Water ice was extruded containing 100% overrun at a temperature of −3.5° C. A rectangular stainless steel nozzle (40 mm×20 mm surface area at nozzle exit) was used to extrude lengths of water ice which were then hardened in a blast freezer at −350° C. for 3 hours, then stored in a cold store at −250° C.

15 cm lengths of hardened product were cut and dipped in molten chocolate (at 45° C.) to produce a chocolate covered water ice bar. This had a brittle, crunchy, and porous texture on eating.

What is claimed is:

1. A water ice comprising an antifreeze protein, a stabiliser and not less than 0.1 wt % of a protein based aerating agent, obtainable by a process comprising aerating the ice confection with an aerating gas which contains at least 50% by volume of a water soluble gas selected from the group consisting of carbon dioxide, nitrous oxide and mixtures thereof.

2. A water ice according to claim 1 wherein the stabiliser is present in an amount of at least 0.1 wt %.

3. A water ice according to claim 1 wherein the antifreeze protein is present in an amount of at least 0.0005 wt %.

4. A water ice according to claim 1 wherein the antifreeze protein is chosen such that gives an aspect ratio of more than 1.9 to the crystal.

5. A water ice according to claim 1 wherein the antifreeze protein is fish type III HPLC 12.

6. A water ice according to claim 1, wherein

Δ modulus/original modulus $\geq$ 0.4, and/or

Δ strength/original strength $\geq$ 0.7; providing that when

Δ modulus/original modulus $\leq$ 6.0, Δ modulus $\geq$ 90 Mpa, and/or when Δ strength/original strength $\leq$ 2.0, Δ strength $\geq$ 0.2 MPa.

7. A process for preparation of a water ice comprising antifreeze protein comprising the steps;
   (i) aeration of a water ice composition with an aerating gas which contains at least 50% by volume of a water soluble gas;
   (ii) freezing in a freezer such that the residence time in the freezer is approximately 2.5 to 10 minutes; and
   (iii) two-stage hardening.

8. A process according to claim 7 wherein the two-stage hardening step occurs by:
   (1) reducing the temperature of the product to below at least −20° C. within approximately 2 hours, followed by
   (2) retaining the product at a temperature of approximately −18° C. or below until the product density stabilises.

9. A process according to claim 7 wherein the water soluble gas is selected from the group consisting of carbon dioxide, nitrous oxide and mixtures thereof.

* * * * *